(12) United States Patent
Yang

(10) Patent No.: US 10,442,005 B2
(45) Date of Patent: Oct. 15, 2019

(54) WORKPIECE APPLIED FOR USE WITH A CUTTING MACHINE

(71) Applicant: SHANGHAI RUIGAO INFORMATION TECHNOLOGY CO., LTD., Shanghai (CN)

(72) Inventor: Yi-Qun Yang, Shanghai (CN)

(73) Assignee: SHANGHAI RUIGAO INFORMATION TECHNOLOGY CO., LTD., Shanghai (CN)

( * ) Notice: Subject to any disclaimer, the term of this patent is extended or adjusted under 35 U.S.C. 154(b) by 29 days.

(21) Appl. No.: 15/567,203

(22) PCT Filed: Apr. 7, 2016

(86) PCT No.: PCT/CN2016/078626
§ 371 (c)(1),
(2) Date: Oct. 17, 2017

(87) PCT Pub. No.: WO2016/165576
PCT Pub. Date: Oct. 20, 2016

(65) Prior Publication Data
US 2018/0161884 A1    Jun. 14, 2018

(30) Foreign Application Priority Data
Apr. 17, 2015  (CN) ........................... 2015 1 0189240

(51) Int. Cl.
*B23B 27/06* (2006.01)
*B23C 5/20* (2006.01)
*B23B 27/14* (2006.01)

(52) U.S. Cl.
CPC ............ *B23B 27/06* (2013.01); *B23B 27/145* (2013.01); *B23C 5/205* (2013.01); *B23B 2200/323* (2013.01); *B23C 2200/0416* (2013.01)

(58) Field of Classification Search
CPC . B23B 27/06; B23B 27/145; B23B 2200/323; B23C 5/205; B23C 2200/0416
See application file for complete search history.

(56) References Cited

U.S. PATENT DOCUMENTS

RE7,021 E   *  3/1876  Disston ........................... 83/842
363,753 A   *  5/1887  Mahaffey ................ B27G 13/10
                                                    144/229

(Continued)

FOREIGN PATENT DOCUMENTS

CN       103978237 A  *  8/2014
DE         3935626 A1  *  5/1991  ................ B26F 1/44

*Primary Examiner* — Sara Addisu
(74) *Attorney, Agent, or Firm* — WPAT, PC

(57) ABSTRACT

A workpiece applied for use with a cutting machine comprises a first outer surface, a second outer surface and a third outer surface. The third outer surface intersects the first outer surface and the second outer surface to define an extrusion-acting portion having an extruding portion. The workpiece can be used to form a cutter or a trimmed portion thereof. Accordingly, rapid production of cutters by molding machines can be realized, and blades of the molding machine for machining a produced cutter become readily replaceable. While a blade portion is machining, the extrusion-acting portion is applied to support and guide the workpiece, such that the surface machined by the blade portion can be extruded and polished simultaneously. Thus, machining qualities of the cutter, including finish, straightness and roundness, manufactured by applying the workpiece for the molding machine can be significantly improved.

23 Claims, 6 Drawing Sheets

(56) References Cited

U.S. PATENT DOCUMENTS

| | | | | |
|---|---|---|---|---|
| 579,383 A * | 3/1897 | Coyle | ............... | B23D 61/06 83/840 |
| 797,947 A * | 8/1905 | Dilks | ............... | B23D 61/06 83/840 |
| 1,416,843 A * | 5/1922 | Labonte | ............... | B23B 27/06 407/103 |
| 2,239,615 A * | 4/1941 | Melde | ............... | B27G 13/10 144/230 |
| 3,838,826 A * | 10/1974 | Wallace | ............. | B02C 13/2804 241/197 |
| 4,628,976 A * | 12/1986 | Loring | ............... | B23D 61/06 144/117.1 |
| 4,755,085 A * | 7/1988 | Muren | ............... | B23B 27/06 407/113 |
| 4,758,050 A * | 7/1988 | Peterson | ............... | B28D 1/18 299/109 |
| 4,826,090 A * | 5/1989 | Orphall | ............. | B02C 13/2804 241/191 |
| 4,930,710 A * | 6/1990 | Hench | ............... | B02C 18/186 241/294 |
| 4,979,849 A * | 12/1990 | Kezran | ............... | B23B 27/06 407/103 |
| 5,042,733 A * | 8/1991 | Hench | ............... | B02C 18/186 144/231 |
| 5,370,023 A * | 12/1994 | Morgan | ............. | B23B 27/007 407/112 |
| 5,681,133 A * | 10/1997 | Hibiske | ............... | B23B 27/06 407/102 |
| D448,780 S * | 10/2001 | Rautio | ............... | D15/139 |
| 2004/0123706 A1* | 7/2004 | Dorsch | ............... | B23B 27/06 82/1.11 |
| 2017/0165764 A1* | 6/2017 | Cheronneau | ............ | B23B 41/12 |

\* cited by examiner

WORKPIECE APPLIED FOR USE WITH A CUTTING MACHINE

BACKGROUND OF INVENTION

1. Field of the Invention

The invention relates to a part for tool manufacturing, and more particularly to the workpiece that can promote production efficiency of a cutting tool.

2. Description of the Prior Art

In mechanical manufacturing, a cutter, or a cutting tool, is defined as a tool for cut-machining. Since majority of cutters are applied in machines, especially those for cutting metal materials, so empirically the term "cutter" is usually realized as the cutter for processing metals. However, with the progress in material science, various new materials can be now widely used in production; for example, engineering plastics and composite carbon-fiber materials (CN203401118U). According to surfaces of workpieces, the machining cutters can be classified into: cutters for machining various outer surfaces, cutters for machining holes, cutters for machining threads, cutters for machining gears and cutters for cutting.

Types of working portion of the cutter can be classified into an integrated type, a welding type and a mechanical type. The integrated type of cutters is to directly form a cutting blade at a blade body, the welding type of cutters is to weld the cutting blade onto the blade body usually made of a steel, and the mechanical type of cutters in further classified into two groups. One group is to clamp fixedly the blade onto the blade body, while another group is to clamp a welded cutter head onto the blade body. Generally, a big-size cutter made of a hard alloy is usually a cutter of welding type or mechanical type.

In the cut-machining, it is inevitable that a frequent-use blade would become blunt. Thus, periodical maintenance to replace or re-polish the blade, or even to replace the entire cutter, is necessary. Thereupon, expense for such services is usually huge. Typically, as shown in FIG. 1, an indexable cutter is introduced to somehow resolve the aforesaid problem. As a blade is blunt, especially at a tip thereof, the blunt blade would be shifted appropriately to have a less-blunt portion thereof to play the major role for cutting. Upon such a shifting adjustment, services in replacing or re-polishing the blade of the cutter would be arranged in a less intense schedule. Thereby, continuation in working with the cutter can prolonged. Also, the replacement task of the cutter would be much easier, and cost and time of the cut-machining would be substantially reduced.

Conventionally, the shape for the blade of the indexable cutter can be a triangle (as shown in FIG. 2), a rectangle (as shown in FIG. 3), a pentagon, a convex triangle, a circle (as shown in FIG. 4), a rhombus (as shown in FIG. 5), and so on. Through screws and the like movable connection means, the blade is clamped fixedly into the groove or blade slot at the blade body. For example, Chinese invention patent No. ZL03809683.8 discloses a cutting tool that includes a blade body having at least one cavity for receiving a cutting blade seat. The cutting tool provides sharp blades to perform cutting upon an object to be machined. However, the disclosed cutting tool can't perform squeezing, extruding or polishing upon the object to be machined, and thus other cutters shall be needed if the forming machining upon the objected to be machined requires squeezing, extruding or polishing.

In Chinese invention patent No. ZL200680033825.7, a milling cutter that can efficiently discharge machining chips is disclosed. The milling cutter includes a blade body having a plurality of cutting blade seats. Each of the cutting blade seats is connected with an end portion of the blade body. The milling blade body is formed to another end portion, opposing axially to the aforesaid end portion. Through a cutter connection means, the milling blade body is fixed, in a manner of being able to shift as an indexable blade, into the blade seat. Each said indexable blade has a basic shape of truncated pyramid for providing a top thereof to face a machining-chip end of the milling cutter. Also, a major cutting edge of the indexable blade is extended from the top and along a direction toward a bottom of the indexable blade.

In Chinese invention application No. 201210582143.9, an indexable blade is disclosed to have an upper surface, a lower surface opposing to the upper surface, and a peripheral surface. Major cutting edges of the indexable blade are formed on the upper surface by closing to a main front blade surface. At least two major cutting edges present two different axial front angles at the same indexable point, with respect to the corresponding main cutting edges. At least two main front blade surfaces are perpendicular to the major cutting edge, and have respective contour angles thereof at respective horizontal cross-sectional surfaces having the corresponding blade axial lines.

In Chinese invention application No. 201310119151.4, a cutting blade is disclosed to include a plate-shape blade body defined by an upper surface, a lower surface, three lateral surfaces and three concave surfaces. These three lateral surfaces and these three concave surfaces, alternately arranged, are integrated to form a continuous ring surface connected between the upper surface and the lower surface. The concave structure is consisted of a peripheral positioning plane and blade slots located at four diagonal ends of the two diagonal lines of the peripheral positioning plane. The main cutting edge is formed by the intersection of the blade slot and the upper surface (or the lower surface). The lateral cutting edge is formed by the intersection of the blade slot and the corresponding lateral surface. The main cutting edges and the lateral cutting edges are connected to form the cutting blade assembly. Such a cutting blade assembly is featured in simple and compact structuring, universal applications, convenience and a high quality/price ratio.

Currently, in a conventional cutter for molding machining, the raw blade is generally prepared into a relevant pattern, and then the patterned blade is welded onto the blade body. It is obvious that the production of the conventional cutter including molding and welding can not be handled simply by machines. Actually, in manufacturing the conventional cutter, work environments are severe to the workers, production time is long-some, quality control is difficult, and naked-eye investigation for sorting blunt blades to determine further re-welding or even discarding is definitely time and labor consuming. Particularly, the recycling rate of turn-down parts is generally low, from which loss in both resources and energy is surely inevitable. Though the conventional indexable cutter can be re-used or quickly replaced via rotating the blade by a specific angle, yet, since the required pattern of cutting edges for a cutter product can be only achieved by stacking a predetermined number of the blade, thus a reduction in the number of cutting edges and in cutting efficiency is then inevitable. In particular, in the case that any blade is blunt, any rework upon the single blunt blade would be impossible to resume the ideal cutter pattern. In addition, since every sides of the blade in the indexable cutter are all blade portions, so the cutter can perform simply cutting, excluding guiding, supporting, extruding and polishing. Thereupon, it is the reason why the cutter with the conventional indexable blades can only applied to execute coarse machining.

SUMMARY OF THE INVENTION

Accordingly, it is the primary object of the present invention to provide a workpiece for increasing machining quality of cutting tool, especially the cutting tool for molding machines, in which the machining quality includes roundness, surface roughness, straightness, and so on.

It is another object of the present invention to provide a workpiece for increasing the production and manufacturing speed of cutting tool, especially the cutting tool for molding machined.

It is a further object of the present invention to provide a workpiece for reducing the production and manufacturing cost of cutting tool, especially the cutting tool for molding machines.

It is one more further object of the present invention to provide a workpiece for enhancing the use efficiency of cutting tool, especially the cutting tool for molding machines.

It is one more further object of the present invention to provide a workpiece for increasing the reusability of cutting tool and for reducing the application cost, especially the cutting tool for molding machines.

It is one more further object of the present invention to provide a workpiece as a cutting portion mounted on the cutting tool so as to perform extruding on molding machines.

It is one more further object of the present invention to provide a cutting tool that treats the aforesaid workpieces as cutting portions and performs contour machining upon the object to be machined via extruding.

In the present invention, the workpiece at least includes a first outer surface, a second outer surface and a third outer surface. The third outer surface intersects the first outer surface and the second outer surface so as to form an extrusion-acting portion at the intersection region. The extrusion-acting portion further includes an extruding portion for performing extruding upon an object to be machined. Through the extrusion-acting portion, the workpiece can be supported and guided. The extrusion-acting portion can also perform extruding and polishing upon the surface machined by the blade portion. In comparison with the conventional blade-type cutter for molding machines, the cutter of the present invention can provide better machining quality in finish, straightness and roundness.

In order to satisfy the requirement in partly machining the object to be machined, a blade portion can be further included to perform cut-machining. When the workpiece acts as a cutting portion assembled to the blade body, the blade portion engages the object to be machined prior to the extrusion-acting portion.

Another workpiece of the present invention is shaped as a plate including a first outer surface, a second outer surface and a third outer surface. The third outer surface as a lateral surface of the workpiece intersects the first outer surface and the second outer surface so as to form an extrusion-acting portion at the intersection region.

In the workpiece of the present invention, at least one assembly portion is further included to match the fixation part. Through the engagement of the assembly portion and the fixation part, the workpiece can be fixed to another object; for example, a blade body.

The fixation part of the present invention is, but not limited to, a screw, a bolt, a rivet, a pin, a plug and a depression plate.

The assembly portion of the present invention is located at the workpiece, a portion of the workpiece or a portion on the workpiece. The assembly portion can be configured as a hole, a surface and a slot. An engagement means between the assembly portion and the fixation part can be, but not limited to, a manner using a screw and a thread hole, a rivet and a hole, a mortise and a tenon, a depression plate and a positioning surface, and a depression plate and a slot.

In the present invention, the workpiece can be fixed or mounted onto a cutter through the connection hole. For example, the workpiece as the cutting portion can be assembled to the blade body for performing contour machining, particularly by extrusion. According to the present invention, no welding for fixation is required, and rapid replacement of the cutting portion can be achieved.

The workpiece of the present invention can act as a contour machining portion to be assembled to the blade body for machining and to meet various requirements in contour machining. Or, before the workpiece is assembled to the blade body, the workpiece is firstly machined into a standard part so as for meeting the rapid-replacement needs of the workpiece for mass production.

The workpiece of the present invention as a contour machining portion can include:
a front outer surface, having a front machining end; and
an extrusion-acting portion, having an extruding portion.

The extruding portion provides a configuration to match the object to be machined and to satisfy the demands in contour machining. For example, to the contour machining, the extruding portion is an arc shape matching a curvature radius of a hole.

The outer surface of the present invention shall be realized as the common exposed surface that can configure or define a pattern of the workpiece. The front outer surface is defined to the front surface in a motion direction of the workpiece. The rear outer surface is defined to the rear surface in the motion direction of the workpiece. It shall be understood that the motion direction of the workpiece can be changed, and the front and rear outer surfaces on the workpiece would be varied accordingly.

The workpiece of the present invention can be formed by lapping or trimming into various derivatives; for example, but not limited to, a step shape, a gear shape and a pillar shape.

Another workpiece of the present invention includes a first arm, a second arm and at least one assembly portion matching the fixation part. An angle between a first plane having an axial line passing the first arm and a second plane having another axial line passing the second arm is between 0° and 180°.

Another workpiece of the present invention includes a first arm, a second arm and at least one connection hole. An angle between a first plane having an axial line passing the first arm and a second plane having another axial line passing the second arm is between 0° and 180°.

In a workpiece of the present invention, the at least one connection hole is located at the first arm or at the second arm, or two said connection holes are included to be simultaneously located at the first arm and the second arm, respectively.

A workpiece of the present invention includes:

a first arm, having thereon at least one first connection hole; and a second arm, having thereon at least one second connection hole;

wherein an angle between a first plane having an axial line passing the first arm and a second plane having another axial line passing the second arm is ranged between 0° and 180°.

Another workpiece of the present invention includes:

a first arm, having thereon at least one first connection hole; and a second arm, having thereon at least one second connection hole;

wherein a first-arm axial line intersects a second-arm axial line by an angle ranging between 0° and 180°.

Another workpiece of the present invention, shaped to be an L shape, includes a first arm, a second arm and at least one connection hole.

Another workpiece of the present invention, shaped to be an L shape, includes a first arm, a second arm and at least one connection hole wherein the at least one connection hole is independently or simultaneously arranged in a first-arm axial direction and a second-arm axial direction.

In the workpiece of the present invention, a first extrusion-acting portion is located laterally to the first arm.

In the workpiece of the present invention, a first blade portion is further included and located at front-end of the first arm.

In the workpiece of the present invention, a second extrusion-acting portion is formed at a front end of the second arm.

In the workpiece of the present invention, a second blade portion is further included to be located laterally to the second arm.

In the workpiece of the present invention, the first arm is a pillar or a plate.

In the workpiece of the present invention, the second arm is a pillar or a plate.

In the workpiece of the present invention, an axial length of the first arm is larger than or equal to that of the second arm.

In the workpiece of the present invention, at least one first connection hole is arranged in the first-arm axial direction.

In the workpiece of the present invention, at least one second connection hole is arranged in the second-arm axial direction.

In the workpiece of the present invention, an angle between a first plane having an axial line passing the first arm and a second plane having another axial line passing the second arm is ranged between 15° and 140°.

In the workpiece of the present invention, an angle between a first plane having an axial line passing the first arm and a second plane having another axial line passing the second arm is 90°.

In the workpiece of the present invention, an angle between an axial line of the first arm and another axial line of the second arm is 90°.

In the workpiece of the present invention, the connection hole is used to fix and assemble the workpiece.

In the workpiece of the present invention, means for fixation or assembly of the cutter can be, but not limited to, threads, position pins, mortise-tenon structures, rivets, depression blocks, and adhesives for screwing, thread-sealing, plane-sealing, fixed holding and binding; such as, but not limited to, photo-cure adhesives, hot-melt adhesives, or a solution or a water borne adhesive having components of epoxy, acrylic esters, polyurethanes, silicone dioxides, improved silanes, or butyl rubbers.

In the workpiece of the present invention, materials for the workpiece includes but not limited to, tool steel, high-speed steel, hard alloy, metal ceramics, ceramics, polycrystalline diamond, monocrystalline diamond, and super hard materials (CBN and PCBN for example). Also, relevant coating on the aforesaid material is helpful as well.

By providing the present invention, advantages are obvious as follows.

The workpiece of the present invention can have the entire or trimmed part of the workpiece to perform machining upon a cutter, such that goals of low cost and rapid production for the molding machine to machine the cutter can be achieved. Also, the replacement of the blade for the molding machine to machine the cutter is thus feasible.

The workpiece of the present invention makes the manufacturing and the maintenance of the machining cutter for molding machines much easier and more rapid, especially to the manufacturing, replacing and maintaining of the cutter for performing extrusion upon parts.

In comparison with the conventional indexable cutter, the workpiece of the present invention can increase remarkably the machining speed of the machining cutter for molding machines. Also, machining precision, surface finish, and straightness as well as roundness of holes can be substantially improved.

In comparison with the blade that is welded fixedly to the cutter, the workpiece of the present invention can make the replacement of the blade much easier, so that cost for production can be significantly reduced.

All these objects are achieved by the workpiece and applications thereof in machining described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a workpiece and applications thereof in machining. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
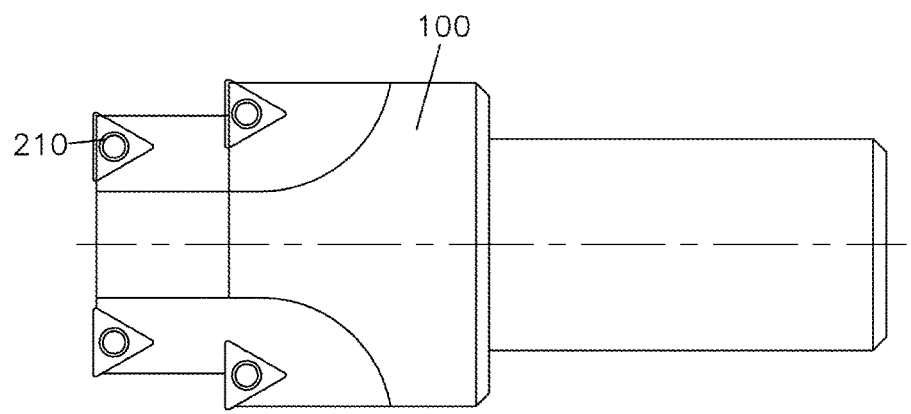
FIG. 1 is a schematic view of an embodiment of an indexable cutter.
Figure 2:
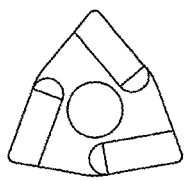
FIG. 2 is a schematic view of an embodiment of the blade for the indexable cutter of FIG. 1.
Figure 3:
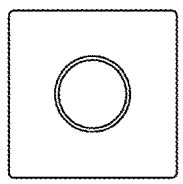
FIG. 3 is a schematic view of another embodiment of the blade for the indexable cutter of FIG. 1.
Figure 4:
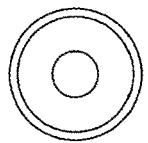
FIG. 4 is a schematic view of a further embodiment of the blade for the indexable cutter of FIG. 1.
Figure 5:
FIG. 5 is a schematic view of one more embodiment of the blade for the indexable cutter of FIG. 1.

FIG. 1 is a schematic view of an embodiment of an indexable cutter in accordance with the present invention. As shown, the indexable cutter includes a blade body 100 having thereon a number of indexable blades 210 to proceed cut-machining upon an object to be machined. In the case that a cutting edge of the indexable blade is blunt, then the cut-machining can be proceeded by turning the blades 210 to have the well-conditioned cutting edge moved to a work position that can contact the object to be machined.

Figure 6:
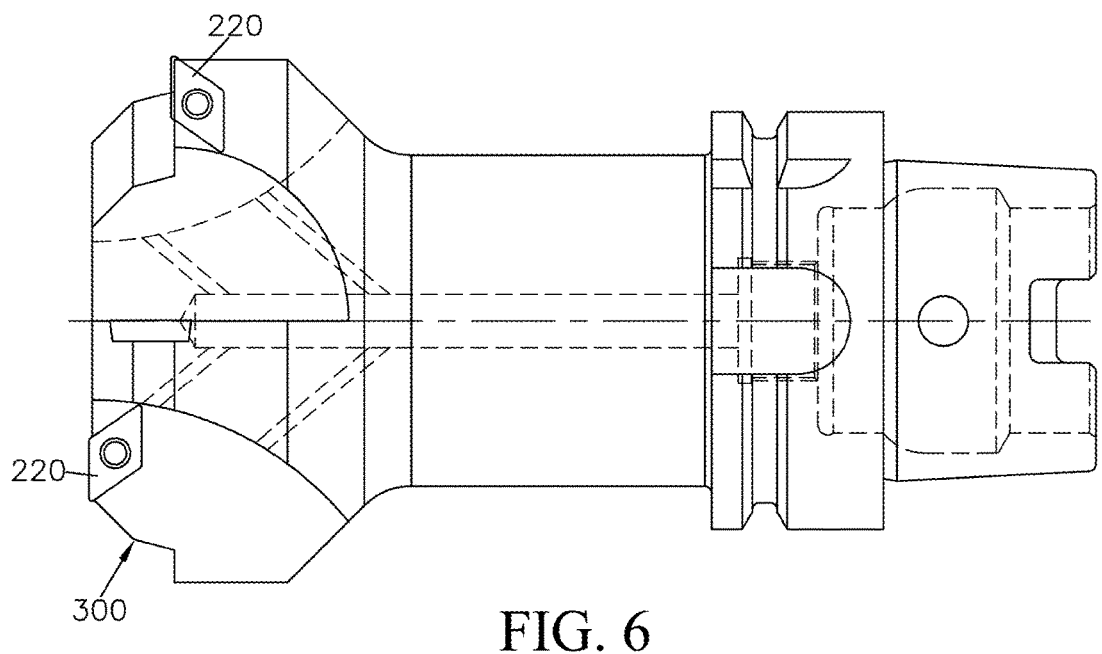
FIG. 6 is a schematic view of an embodiment of an indexable cutter for a contour machining in accordance with the present invention.
Figure 7:
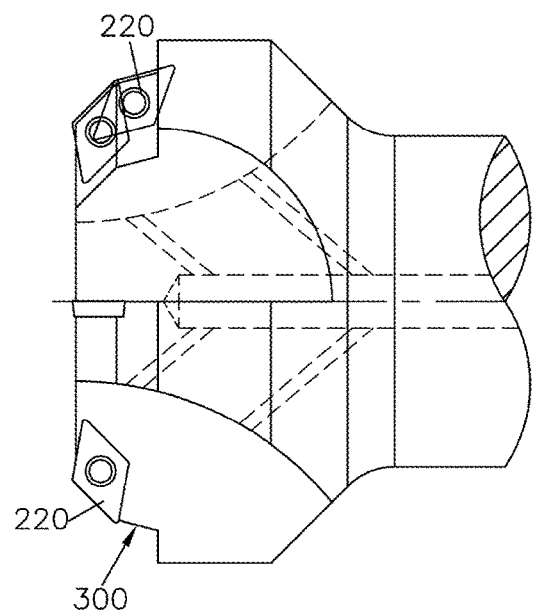
FIG. 7 is a schematic view of another embodiment of the indexable cutter for the contour machining in accordance with the present invention.
Figure 8:
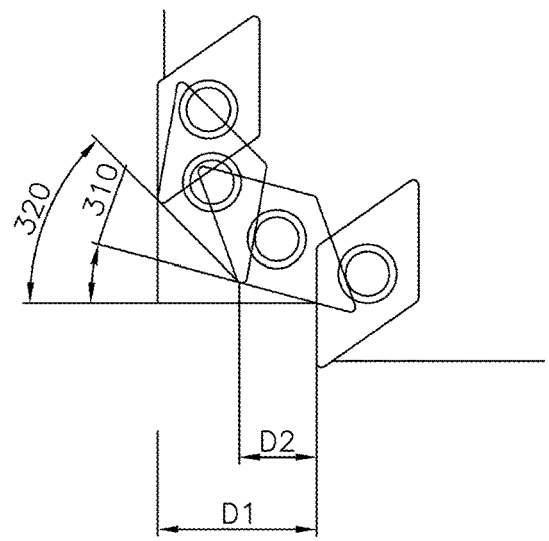
FIG. 8 is a schematically enlarged view of an arrangement of blades of the indexable cutter for the contour machining in accordance with the present invention.

When the object to be machined is limited to a specific pattern, then the demand for the contour of the blade of cutter for machining would be higher. FIG. 6 is a schematic view of an embodiment of an indexable cutter for a contour machining in accordance with the present invention, and FIG. 7 is a schematic view of another embodiment of the indexable cutter for the contour machining in accordance with the present invention. As shown in FIG. 6 and FIG. 7, the finish pattern of cutting edges of the blades is obvious impossible to be produced by a single or a few number (2 for example) of angular adjustments at the cutting blades. Definitely, contour machining to produce the indexable cutter of FIGS. 6 and 7 can be achieved by stacking a number of indexable rhombus blades 220. FIG. 8 proposes a feasible scheme of stacking four indexable rhombus blades 220 to obtain a complete curve for the desired cutting edge. By adopting four rhombus blades 220 at different angling, a stack of blades 220 is formed to have a first angle of 310°, a second angle of 320°, an offset D1 between an blade tip and a bottom of the blade, and a distance D2 between the top of the blade 2 and the bottom of the blade 220. As shown in FIG. 8, overlapped areas exist at any two blades 220. In addition, four respective blade seats are required to mount the aforesaid four rhombus blades 220, from which plenty troubles are caused to the production of these four stacked blades 220. On the other hand, while in use, four cutting slots are needed so as able to machine the desired finish cutting surface. When the cutter makes a complete turn, then a deep-cut at the material can be made, which is effectively equivalent to a work of a single cutter with a single blade.

Figure 14:
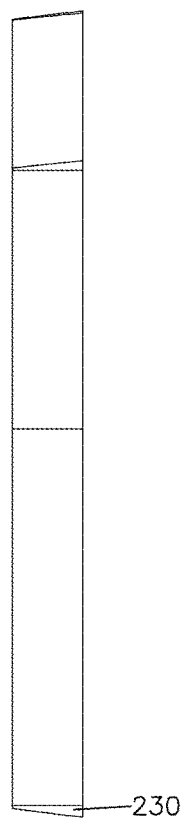
FIG. 14 is a schematic left-side view of FIG. 8.

FIG. 14 is a schematic left-side view of FIG. 8. In a cutter formed by integrating plural indexable blades, the cutting edge 230 can only be used to perform blade cutting, and can't be used to perform margin cutting.

Figure 16:
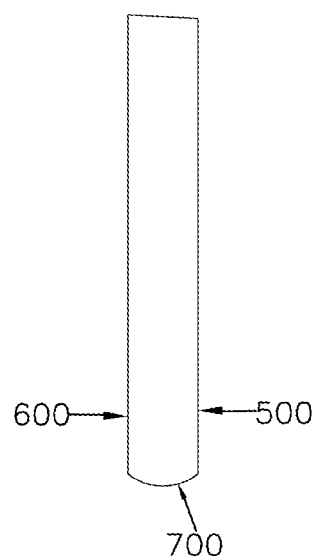
FIG. 16 is a schematic top view of another embodiment of the workpiece in accordance with the present invention.

FIG. 16 is a schematic top view of another embodiment of the workpiece in accordance with the present invention. As shown, the workpiece includes a first outer surface 500, a second outer surface 600 and a third outer surface 700. The third outer surface 700 intersects the first outer surface 500 and the second outer surface 600 so as thereby to define thereinside an extrusion-acting portion (the area enclosed by the first outer surface, the second outer surface and the third outer surface). The extrusion-acting portion includes an extruding portion for performing extrusion. Machine the first outer surface and the second outer surface independently or simultaneously so as to form the blade portion (not shown in the figure) for performing cut-machining. In this embodiment, the workpiece is shaped as a plate, able to be joined into form various shapes of derivative workpieces. For example, but not limited to, a step structure, a gear shape, a pillar shape and so on.

Figure 9:
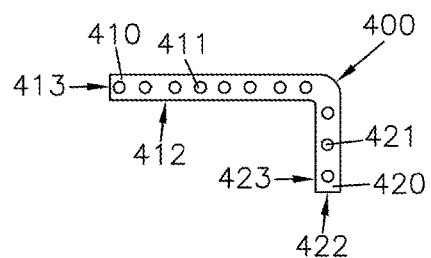
FIG. 9 is a schematic view of an embodiment of the workpiece in accordance with the present invention.
Figure 10:
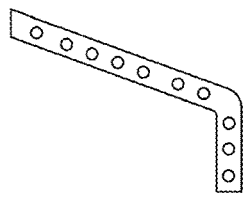
FIG. 10 is a schematic view of another embodiment of the workpiece in accordance with the present invention.
Figure 11:
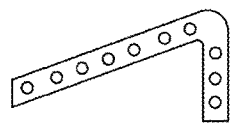
FIG. 11 is a schematic view of a further embodiment of the workpiece in accordance with the present invention.

FIG. 9 is a schematic view of an embodiment of the workpiece in accordance with the present invention, FIG. 10 is a schematic view of another embodiment of the workpiece in accordance with the present invention, and FIG. 11 is a schematic view of a further embodiment of the workpiece in accordance with the present invention. As shown in FIG. 9, FIG. 10 and FIG. 11, the workpiece 400 of the present invention includes a first arm 410, a second arm 420 and at least one assembly portion pairing the fixation part. In this embodiment, the assembly portion can be configured to be a hole for pairing the respective fixation part such as a screw, a bolt, a rivet, a plug, a pin and any the like. The first arm 410 has at least one first connection hole 411, and the second arm 420 has at least one second connection hole 412.

In this embodiment, the workpiece 400 is presented to be an L shape, an axial length of the first arm 410 is greater than that of the second arm 420. The first-arm axial line crosses the second-arm axial line to form an angle between 0° and 180°, preferably to the 0°.

The first arm 410 can be a pillar or a plate, having a lateral extruding portion 412. According to practical requirements, a first blade portion 413 is located at a front end of the first arm 410, such that, while the workpiece is under machining, the first blade portion 413 would firstly perform cut-machining at the object, and then perform extrusion through the extruding portion 412.

The second arm 420 can be a pillar or a plate, having an extruding portion 422 at a front end thereof. According to practical requirements, a second blade portion 423 is located at the front end, such that, while the workpiece is under machining, the second blade portion 423 would firstly perform cut-machining at the object, and then perform extrusion through the extruding portion 422.

The assembly portion paired with the fixation part can be an area portion on the workpiece to pair a depression plate. The depression plate has one end thereof to mechanically connect the blade body, while another end thereof is to contact the are portion on the workpiece, so as to exert an application force upon the workpiece. While the workpiece acts as the contour machining portion to perform the contour machining upon the object. The depression plate utilizes the area portion on the workpiece to perform fixation and prevention/inhibition from sliding/shaking upon the contour machining portion.

Figure 12:
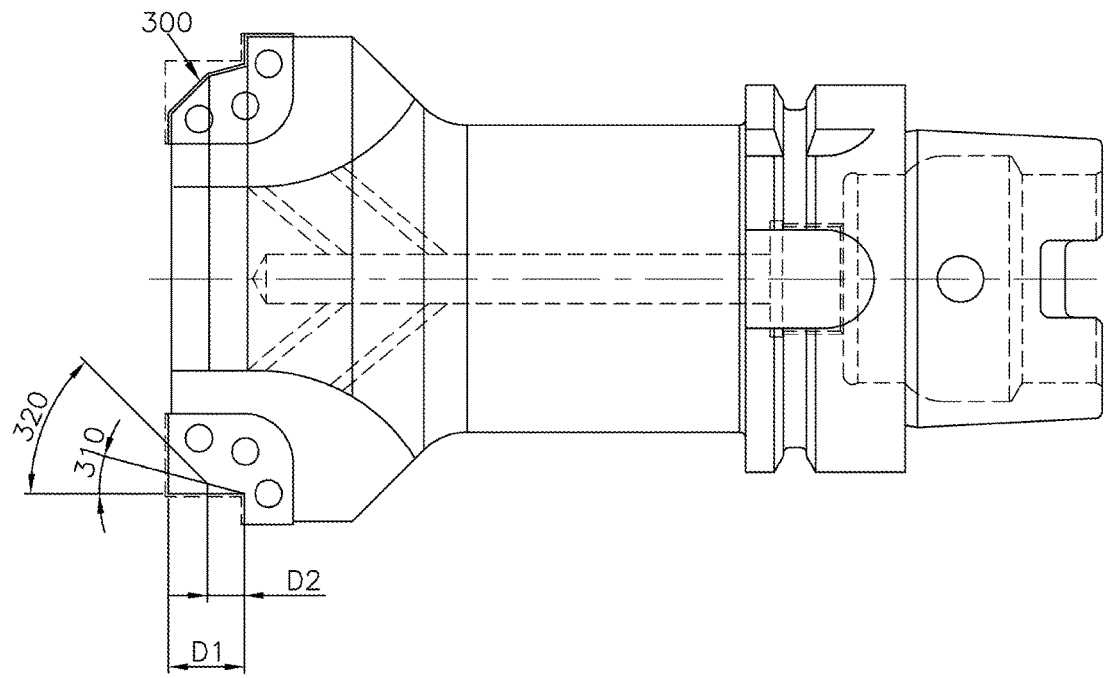
FIG. 12 is a schematic view of an embodiment of a cutting tool applied to the workpiece in accordance with the present invention.

In this embodiment, the entire or a portion of workpiece can be used as the contour machining portion to be directly applied to the machining cutter for performing contour machining. Or, according to demands of the object to be contour machined, after the entire or a portion of workpiece as the contour machining portion to be mounted onto the cutting tool, the desired contour of the cutting edge is then produced by re-machining. Alternatively, after the workpiece is firstly machined into a standard part, then the standard part is mounted onto the cutting tool to fulfill the requirement of rapidly replacing the workpiece during machining (referring to FIG. 13). FIG. 12 is a schematic view of an embodiment of a cutting tool applied to the workpiece in accordance with the present invention. As shown in FIG. 12, a part is firstly cut off from the workpiece 400, and then the workpiece 400 is fixed or mounted to the blade seat through the connection hole. The workpiece 400 is then machined to obtain a pattern of cutting edge having a first angle 310, a second angle 320, an offset D1 between the edge tip and the edge bottom, and a distance D2 between the highest point of the edge-side protrusion and the edge bottom. In comparison with the conventional blade that is welded fixedly onto the cutter, the indexable blade of this present invention needs no welding to complete the fixation, and also the goal of rapidly replacing the cutting portion can be achieved. Compared to the cutter adopting the indexable blades in FIG. 6, FIG. 7 and FIG. 8, the application of the workpiece in this embodiment in accordance with the present invention can significantly reduce the number of the blade seats (reduced to 1 from 4). Also, the production time can be greatly shortened, and the production efficiency can be enhanced remarkably (by four times). On the other hand, while in application, by having the aforesaid embodiment including four cutter slots for installing four said indexable blades as a typical example, then four deep-depth materials can be cut off in a single turn of the cutter. Thereupon, four times of use efficiency can be obtained.

Figure 13:
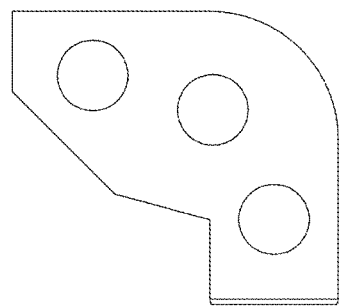
FIG. 13 is a schematic view of an embodiment of the workpiece applicable to the contour machining portion in accordance with the present invention.
Figure 15:
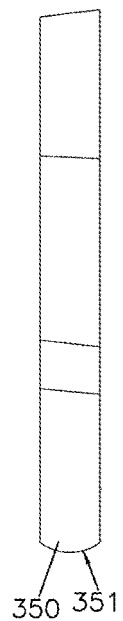
FIG. 15 is a schematic left-side view of FIG. 13.

FIG. 15 is a schematic left-side view of FIG. 13. As shown, the workpiece provided by the present invention herein as the contour machining portion includes an extrusion-acting portion 350. The extrusion-acting portion 350 further includes an extruding portion 351 in an arc shape to match the curvature of a hole to be machined, and thus is applicable to extrusion of the contour machining.

While the present invention has been particularly shown and described with reference to a preferred embodiment, it will be understood by those skilled in the art that various changes in form and detail may be without departing from the spirit and scope of the present invention.

What is claimed is:

1. A workpiece applied for use with a cutting machine, comprising:
    a first arm, extending along a first-arm axial line, comprising a first blade end, a first connecting end, and a first extruding portion between said first blade end and said first connecting end;
    a second arm, extending along a second-arm axial line, comprising a second extruding end, a second connecting end, and a second blade portion between said second extruding end and said second connecting end, wherein said second connecting end connects to said first connecting end, and said first-arm axial line and said second axial-line are angled between 0° and 180°; and
    at least one assembly portion;
    wherein said workpiece attached to an object via the assembly portion and a fixation part.

2. The workpiece of claim 1, characterized in that an engagement means between the assembly portion and the fixation part is a manner using a screw and a thread hole, a rivet and a hole, or a mortise and a tenon.

3. The workpiece of claim 1, characterized in that the workpiece includes the first arm, the second arm and at least one connection hole, the angle between the first plane having the first-arm axial line and the second plane having the second-arm axial line being ranged between 0° and 180°.

4. The workpiece of claim 3, characterized in that the connection hole is located at the first arm.

5. The workpiece of claim 3, characterized in that the connection hole is located at the second arm.

6. The workpiece of claim 3, characterized in that the workpiece includes two said connection holes located respectively at the first arm and the second arm.

7. The workpiece of claim 1, characterized in that:
    the first arm, having thereon at least one first connection hole;
    the second arm, having thereon at least one second connection hole;
    wherein the angle between the first plane having the first-arm axial line and the second plane having the second-arm axial line is ranged between 0° and 180°.

8. The workpiece of claim 1, characterized in that:
    the first arm, having thereon at least one first connection hole;
    the second arm, having thereon at least one second connection hole;
    wherein an intersection angle between the first-arm axial line and the second-arm axial line is ranged between 0° and 180°.

9. The workpiece of claim 1, characterized in that the workpiece is an L shape.

10. The workpiece of claim 1, characterized in that the first arm is one of a pillar or a plate.

11. The workpiece of claim 1, characterized in that the second arm is one of a pillar or a plate.

12. The workpiece of claim 1, characterized in that the first extrusion-acting portion is formed laterally to the first arm.

13. The workpiece of claim 12, characterized in that the workpiece further includes a first blade portion located at a front end of the first arm, so that the first blade portion firstly performs cut-machining upon the object, and then the first extruding portion performs extruding upon the object.

14. The workpiece of claim 1, characterized in that a front end of the second arm is formed to be a second extrusion-acting portion.

15. The workpiece of claim 14, characterized in that the workpiece further includes a second blade portion located laterally to the second arm, so that the second blade portion firstly performs cut-machining upon the object, and then the second extruding portion performs extruding upon the object.

16. The workpiece of claim 1, characterized in that an axial length of the first arm is larger than or equal to that of the second arm.

17. The workpiece of claim 1, characterized in that at least one first connection hole is located along an axial direction of the first arm.

18. The workpiece of claim 1, characterized in that at least one second connection hole is located along an axial direction of the second arm.

19. The workpiece of claim 1, characterized in that the angle between the first plane having the first-arm axial line and the second plane having the second-arm axial line is ranged between 15° and 140°.

20. The workpiece of claim 1, characterized in that the angle between the first plane having the first-arm axial line and the second plane having the second-arm axial line is 90°.

21. The workpiece of claim 1, characterized in that the entire workpiece or a trimmed portion of the workpiece is used for machining a cutter.

22. The workpiece of claim 1, characterized in that the entire workpiece or a trimmed portion of the workpiece is used as a machining cutter for performing contour machining.

23. A machining cutter, characterized in that the machining cutter includes the workpiece of claim 1.

\* \* \* \* \*